United States Patent
Seely et al.

(10) Patent No.: US 7,455,307 B2
(45) Date of Patent: Nov. 25, 2008

(54) QUICK STEPPER

(76) Inventors: John E. Seely, 895 C.R. 2480, Hico, TX (US) 76457; Tommy R. Thompson, 895 County Rd. 2480, Hico, TX (US) 76457

(*) Notice: Subject to any disclaimer, the term of this patent is extended or adjusted under 35 U.S.C. 154(b) by 48 days.

(21) Appl. No.: 11/351,204

(22) Filed: Feb. 10, 2006

(65) Prior Publication Data
US 2007/0187921 A1    Aug. 16, 2007

(51) Int. Cl.
*B60R 3/00* (2006.01)
(52) U.S. Cl. .................. 280/163; 280/165; 182/150; 182/90; 182/92
(58) Field of Classification Search ................. 180/163, 180/164.1, 165, 166, 164.2; 182/198, 197, 182/196, 150, 127, 91, 92, 90
See application file for complete search history.

(56) References Cited

U.S. PATENT DOCUMENTS

| | | | | |
|---|---|---|---|---|
| 686,182 A * | 11/1901 | Wright | ................ | 182/196 |
| 2,378,678 A * | 6/1945 | Anderson | ................ | 182/150 |
| 2,848,150 A * | 8/1958 | Tans | ................ | 182/150 |
| 4,243,121 A * | 1/1981 | Kiss et al. | ................ | 182/196 |
| 4,782,916 A * | 11/1988 | Hays | ................ | 182/150 |
| 4,907,674 A * | 3/1990 | Miller | ................ | 182/150 |
| 4,947,961 A * | 8/1990 | Dudley | ................ | 182/150 |
| 5,133,429 A * | 7/1992 | Densley | ................ | 182/150 |
| 5,456,479 A * | 10/1995 | Conger | ................ | 280/165 |
| 6,152,470 A * | 11/2000 | Stuart et al. | ................ | 280/163 |
| 6,279,681 B1 * | 8/2001 | Dibelardino et al. | ................ | 182/198 |
| 6,347,678 B1 * | 2/2002 | Osborn et al. | ................ | 280/163 |
| 6,457,558 B1 * | 10/2002 | Ehnes | ................ | 182/150 |
| 6,460,654 B2 * | 10/2002 | Dibelardino et al. | ................ | 182/197 |
| 6,499,564 B2 * | 12/2002 | Puglisi | ................ | 280/163 |
| 6,530,455 B1 * | 3/2003 | Arnette et al. | ................ | 182/198 |
| 6,550,578 B1 * | 4/2003 | Law et al. | ................ | 182/150 |
| 6,578,666 B1 * | 6/2003 | Miller | ................ | 280/163 |
| 6,957,719 B2 * | 10/2005 | Ehnes | ................ | 182/150 |
| 7,059,449 B2 * | 6/2006 | Zhang | ................ | 182/150 |
| 7,168,523 B1 * | 1/2007 | Tafoya et al. | ................ | 182/150 |

* cited by examiner

*Primary Examiner*—Hau V Phan
(74) *Attorney, Agent, or Firm*—James E. Walton

(57) ABSTRACT

The purpose of the present invention is to provide access to some outside portions of a vehicle that is difficult to reach. The solution provided consist of two steps temporarily attached to a vehicle tire and supported with webbing material and pressure activated hangers.

18 Claims, 1 Drawing Sheet

QUICK STEPPER

CROSS-REFERENCE TO RELATED APPLICATIONS

"Not Applicable"

REFERENCE TO RELATED APPLICATIONS

"Not Applicable"

STATEMENT REGARDING FEDERALLY SPONSORED RESEARCH OR DEVELOPMENT

"Not Applicable"

REFERENCE TO SEQUENCE LISTING, A TABLE, OR A COMPUTER PROGRAM LISTING COMPACT DISC APPENDIX

"Not Applicable"

BACKGROUND OF THE INVENTION

1. Field of the Invention

The present invention relates to tire steps, and more specifically to steps that are quick and easy to use.

2. Discussion of the Prior Art

This invention challenges the problem of a person entering the hauling bed of a truck which is, most often, a farm type pickup truck. The problem is escalated if a trailer is attached and if the trailer is a gooseneck variety, the problem is further increased.

The gooseneck trailer tongue hitches to a towing ball located over the rear axle and centered in the hauling bed of a truck. The attachment mechanism is physically lowered and locked or unlocked on the ball and, because of the hitching location, is difficult to reach, or impossible for some, if standing on the surface that also lays beneath the wheels. Temporary steps are needed to make reaching this mechanism more attainable and the most logical and convenient location to mount steps is on a tire and wheel assembly.

Other situations where the present invention can be helpful are loading and unloading top carrier racks on vehicles, notably, sport utility vehicles, and servicing or repairing engines of most vehicles.

Although similar ideas and methods have been introduced, the present invention is uniquely easy to use, simple in design, versatile and inexpensive to produce. Thus, it provides a quick acceptable solution for the foregoing problems mentioned and, possibly, many not mentioned.

BRIEF SUMMARY OF THE INVENTION

The present invention provides two temporary steps attached to a tire and loosely draped over the wheel of a vehicle. The steps are centered between, and fastened to, a strap, comprised of webbing material, placed near each end of the parallel steps. The web straps are riveted to metal strips that are in line with the straps and formed to hook over the top area of the tire and lock. The invention is portable and easily attached or removed. The materials used enable a variety of color choices. In addition, the flexible webbing design provides a durable light weight unit that collapses for storing in a compact space.

DETAILED DESCRIPTION OF THE PREFERRED EMBODIMENTS

Figure 1:
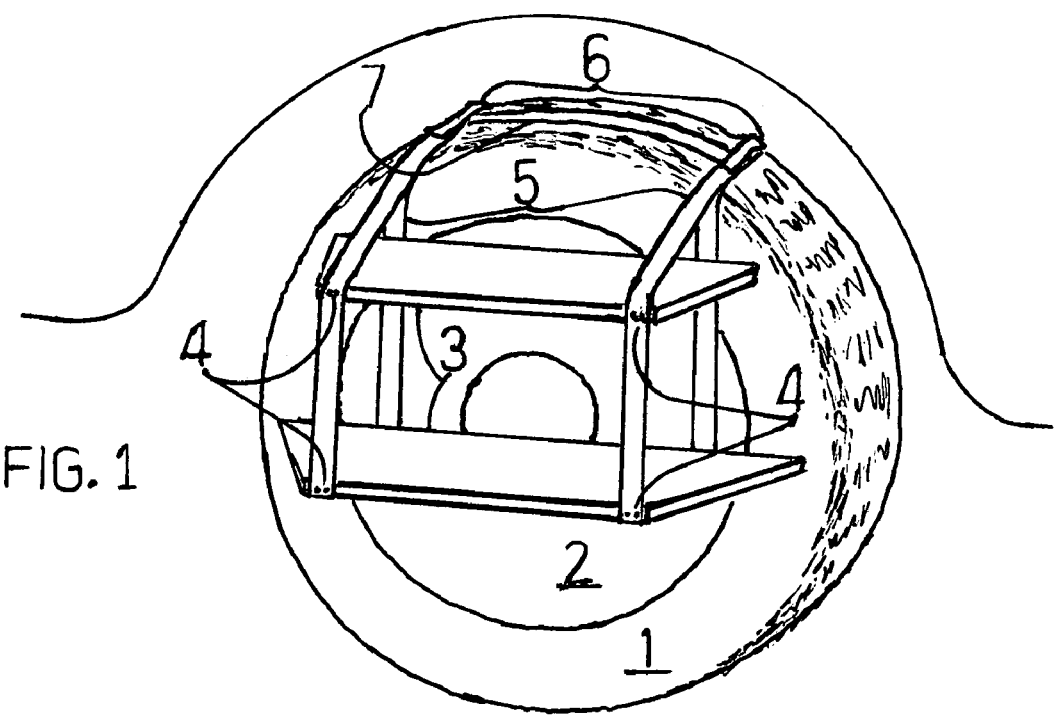
FIG. 1 shows the invention in a mounted position on a tire and wheel.

FIG. 1 is a tire 1 and wheel 2 assembly with the invention placed on the tire 1. Two steps 3, fabricated to contact the outside tire 1 wall, are secured, both front and back, with fasteners 4 at convenient levels between web straps 5. The steps 3 are parallel to each other and the surface beneath the tire 1. The webbing 5 cradles the bottom step 3 near each end, this enables a continuous web strap 5 to be used on each side of the invention. Both straps 5, placed against the tire 1, are connected to medal hangers 6 at a position on the back side of the tire 1. A cross strap 7, also webbing material, is in place near the center of the rolling surface on the tire 1 and fastened to the web straps 5. The opposite end of the continuous web straps 5 pass up the front side of the steps 3 and stop after riveted to both the cross strap 7 and bottom strap 5.

Figure 2:
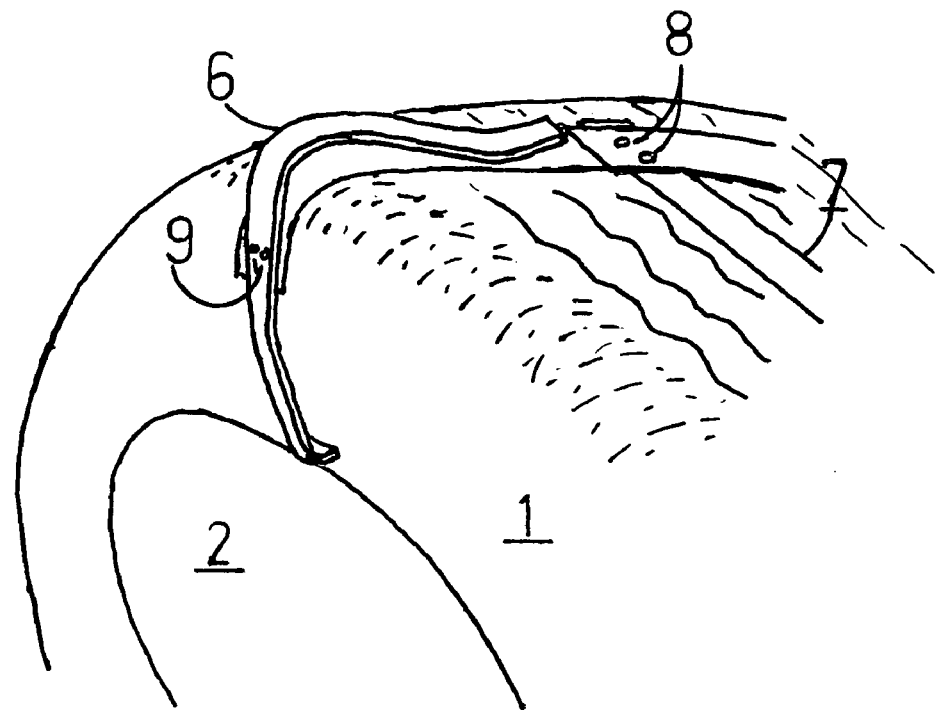
FIG. 2 is one of the two fabricated hangers that secures the invention on the tire. The hanger is locked, due to weight pressure applied, on the blind side of a tire and attached to the web strap that supports one side of the parallel steps as seen in FIG. 1.

FIG. 2 is an upscale drawing of a tire 1 and shows a typical metal hanger 6 positioned on the back side of the tire 1. The hangers 6 have a unique design that intensifies holding strength as more pressure from weight applied to the steps 3 increases. Both ends of the typical web strap 5 is visible with one end riveted 9 to the typical medal hanger 6. Rivets 8 connect the other end of the typical strap 5 to both the cross strap 7 and the typical web strap 5, beneath.

In accordance with the preferred embodiment of the invention, the two steps 3 are formed of a molded plastic or pressure treated wood material. The 1½ inch wide webbing 5 is flexible plastic and secured with 3/16 inch steel rivets 8 where jointed. Also, the said rivets are used to rivet 9 the metal hangers 6 to the straps 5. The hangers are fabricated from 1¼×⅛ inch mild steel and coated with plastic. In conclusion, the fasteners 4, used to secure the steps 3 to the straps 5, can be screws if the steps are a solid material, or the said rivets if structural molded plastic is used.

The steps may be made of polypropylene. The webbing material that forms the straps may be made of plastic, polyester, nylon, or polypropylene. The hangers may be made from a steel material. The hangers may be coated with plastic or polypropylene. The screws may be cadmium plated.

Those skilled in the art will understand, from the foregoing, that the invention has been described with reference to its preferred embodiments. Also, it should be understood, by those skilled, that the implementation of other variations and modifications of the invention will be apparent and such changes may be made and still fit within the spirit and scope of the present invention, which is intended to be limited only by the accompanying claims.

The invention claimed

1. A tire step device, comprising:
   a plurality of steps, each step having a back edge for engaging a tire, an opposing front edge, and a pair of opposing side edges;
   two flexible straps for connecting the steps together, the straps extending from a lowermost step, past an uppermost step, and terminating at an upper end; and two separate hangers, one hanger being connected to the upper end of each strap, each hanger having a lip portion at one end and a support portion at an opposing end, each strap being connected to a corresponding hanger at an intermediate portion of the hanger;

wherein each strap passes in front of the front edge of each step and behind the back edge of each step.

2. The tire step device according to claim 1, further comprising:

a flexible cross strap for connecting the straps together, the cross strap being disposed between the uppermost step and the hangers.

3. The tire step device according to claim 1, wherein the cross strap is positioned to pass over the top of the tire when the hangers are hooked onto an inside surface of the tire.

4. The tire step device according to claim 1, wherein the steps are configured to be supported by the outside wall of the tire.

5. The tire step device according to claim 1, wherein the steps are formed from a wood material.

6. The tire step device according to claim 1, wherein the steps are formed from a plastic material.

7. The tire step device according to claim 1, wherein the steps are formed from a polypropylene material.

8. The tire step device according to claim 1, wherein the straps are formed from a webbing material.

9. The tire step device according to claim 1, wherein the straps include one or more of polyester, nylon, polypropylene.

10. The tire step device according to claim 1, wherein the hangers are formed from a steel material.

11. The tire step device according to claim 10, wherein the hangers are coated with a plastic material.

12. The tire step device according to claim 1, wherein the steps are configured to nest with each other when the tire step device is collapsed upon itself.

13. The tire step device according to claim 1, wherein each hanger is configured such that each lip portion of each hanger engages an inside surface of the tire and each support portion of each hanger engages a top portion of the tire when the tire step device is installed onto the tire.

14. The tire step device according to claim 1, wherein each hanger is configured such that the holding strength of each hanger is increased as the tension on the straps is increased.

15. The tire step device according to claim 14, wherein each strap is connected to an inside surface of a corresponding hanger.

16. The tire step device according to claim 14, wherein each hanger is formed from an elongated strip of material.

17. The tire step device according to claim 14, wherein the lip portion of each hanger is an inwardly turned tab, each strap is connected to the corresponding hanger at a location corresponding to an inside portion of the tire when the tire step device is installed on the tire, and the support portion of each hanger terminates with an upturned tab.

18. A ladder for use with a vehicle tire, the ladder comprising:

a top step and a bottom step, each step having a back edge for engaging a front surface of the tire, an opposing front edge, and a pair of opposing side edges;

flexible straps for connecting the steps together, the straps extending from the bottom step, past the top step, and terminating at an upper end, each strap passing in front of the front edge of each step and behind the back edge of each step; and two separate hangers, one hanger being connected to the upper end of each strap, each hanger having a lip portion at one end for gripping an inside surface of the tire and a support portion at an opposing end for bearing against a top surface of the tire, each strap being connected to a corresponding hanger at an intermediate portion of the hanger, each hanger being formed from an elongated strip of material.

* * * * *